(12) United States Patent
Bean et al.

(10) Patent No.: US 9,638,348 B2
(45) Date of Patent: May 2, 2017

(54) GAS FLOW LIMITER FOR A FUEL SYSTEM AND PROCESS FOR USE THEREOF

(71) Applicant: Caterpillar Inc., Peoria, IL (US)

(72) Inventors: Sunil Bean, Peoria, IL (US); Andrew Neaville, Mt. Pulaski, IL (US); Joshua Steffen, El Paso, IL (US)

(73) Assignee: Caterpillar Inc., Peoria, IL (US)

( * ) Notice: Subject to any disclaimer, the term of this patent is extended or adjusted under 35 U.S.C. 154(b) by 137 days.

(21) Appl. No.: 14/702,258

(22) Filed: May 1, 2015

(65) Prior Publication Data
US 2016/0319788 A1 Nov. 3, 2016

(51) Int. Cl.
F02M 21/02 (2006.01)
F16K 31/363 (2006.01)
F16K 31/02 (2006.01)
F02M 43/00 (2006.01)

(52) U.S. Cl.
CPC ......... F16K 31/363 (2013.01); F02M 21/026 (2013.01); F02M 21/0278 (2013.01); F02M 43/00 (2013.01); F16K 31/02 (2013.01); Y02T 10/32 (2013.01)

(58) Field of Classification Search
CPC ............. F02M 59/365; F02M 59/366; F02M 63/0017; F02M 69/54; F02M 21/0278; F02M 21/026; F16K 31/363; F16K 31/02; F02B 43/00; F02D 19/02; F02D 19/021; F02D 19/022; F02D 19/023; F02D 19/0663; F02D 19/0673; F02D 19/0678; F02D 19/0681; F02D 21/02
USPC ................. 123/525, 529, 457, 458, 510, 511
See application file for complete search history.

(56) References Cited

U.S. PATENT DOCUMENTS

| 5,611,316 | A | 3/1997 | Oshima et al. |
| 6,758,233 | B2 | 7/2004 | Sulatisky et al. |
| 8,944,030 | B2 * | 2/2015 | Suda ............ F02M 37/0029 123/457 |
| 2012/0199102 | A1 | 8/2012 | Hoefer et al. |
| 2014/0145100 | A1 | 5/2014 | Ishibashi et al. |
| 2014/0352664 | A1 * | 12/2014 | Coldren ............ F02D 19/0694 123/445 |

FOREIGN PATENT DOCUMENTS

JP 2002070632 A 3/2002

* cited by examiner

Primary Examiner — Hai Huynh

(57) ABSTRACT

System and methods for controlling a flow of fluid in a fuel system are disclosed. In an aspect, a gas admission system includes a gas admission valve assembly having an inlet, an outlet, and a valve configured to control a flow of fluid between the inlet and the outlet and a flow limiter assembly in fluid communication with the inlet of the gas admission valve assembly.

20 Claims, 6 Drawing Sheets

GAS FLOW LIMITER FOR A FUEL SYSTEM AND PROCESS FOR USE THEREOF

TECHNICAL FIELD

The present disclosure is related to a gas flow limiter for a fuel system such as a natural gas fuel system and/or a dual fuel system, and more particularly to a flow limiter assembly for a gaseous fuel admission valve.

BACKGROUND

Internal combustion engines may be operated at least partly on gaseous fuel and may include gaseous fuel internal combustion engines and dual fuel internal combustion engines. In gaseous fuel internal combustion engines and dual fuel internal combustion engines, at least one gaseous fuel admission valve (e.g., gas admission valve), herein also referred to as gas admission valve, may be positioned between a source of gaseous fuel and a combustion chamber of the engine to control a flow of gaseous fuel into a combustion chamber, for example, via an air intake. For example, when a gas admission valve is opened, gaseous fuel may pass into the air intake for mixing with intake air.

Gaseous fuel may be premixed with the intake air and admitted into a cylinder to replace a required amount of diesel needed to achieve ratings and power demands. In this type of application, it is highly desirable to detect and respond if a failure has occurred in which too much gas is being premixed and sent to the cylinder to avoid undesirable operation or a catastrophic failure. More specifically, it is desirable to respond to any failure in the engine that could result in over fueling such as, but not limited to, the failure of a gas admission valve. It is desirable to have a mitigation strategy that may react as soon as a failure occurs, preventing undesirable operation of the engine or catastrophic failure to the engine.

In U.S. Pat No. 5,529,387, a solenoid operated orifice shut-off valve includes a piston head with a discharging orifice which is sealed by the pilot pin of a solenoid operated popper and a charging orifice by which high pressure fluid from the valve inlet is supplied. Solenoid actuated gas admission valves (SOGAVs) include a solenoid coil, a movable plate, and a stationary plate or disc, whereby a current delivered to the solenoid coil actuates the valve by lifting the movable plate from the stationary plate.

One problem which may arise in combustion engines utilizing a gas fuel admission valve includes an instantaneous load change, where the engine runs at relatively high load and then suddenly operates under a low load, the engine may over-speed and, consequently, the engine may completely shut down due to an inability to resume fuel injection.

Another problem that may arise is that the gas admission valve may open at undesirable times. For example, in the case of a solenoid actuated gas admission valve, a pressure difference between intake air and the gaseous fuel system may result in opening of the gas admission valve. As another example, small particulates may get trapped in the valve, for example, between the movable plate and the stationary plate or the seat of the solenoid actuated gas admission valve, and the valve may no longer close properly. As a further example, wear as well as contamination of the gas admission valve may result in leakage, increased pass rate, or even a stuck open gas admission valve. Other problems may similarly present issues in the operation of the gas admission valve.

These and other shortcomings of the prior art are addressed by the present disclosure.

SUMMARY OF THE DISCLOSURE

A gas admission system may comprise a gas admission valve assembly having an inlet, an outlet, and a valve configured to control a flow of fluid between the inlet and the outlet; and a flow limiter assembly in fluid communication with the inlet of the gas admission valve assembly, the flow limiter assembly comprising: an intake conduit configured to receive a gaseous fuel from the gaseous fuel system; a valve chamber comprising an intake end and a discharge end distal to the intake end, wherein the valve chamber is in fluid communication with the intake conduit at the intake end and the inlet of the gas admission valve assembly at the discharge end; a valve seat fixedly provided at the discharge end of the valve chamber, wherein the valve seat includes a channel extending therethrough; a discharge conduit in fluid communication with the channel of the valve seat; a valve body movably provided within the valve chamber, the valve body comprising a control orifice extending therethrough, wherein the control orifice is configured to regulate a position of the valve body between the intake end and the discharge end of the valve chamber based on a pressure difference between the intake conduit and the discharge conduit; and a spring element disposed between the valve seat and the valve body, wherein the spring element is configured to bias the valve body towards the intake end of the valve chamber, wherein the valve body is configured to abut against the valve seat to prevent a flow of the gaseous fuel between the valve chamber and the channel of the valve seat in response to a first predetermined pressure difference between the intake conduit and the discharge conduit.

An internal combustion engine may comprise a gaseous fuel source; a plurality of cylinders; a gas admission valve assembly having an inlet in fluid communication with the gaseous fuel source and an outlet in fluid communication with at least one of the plurality of cylinders; a flow limiter assembly comprising: an intake conduit configured to receive a gaseous fuel from the gaseous fuel source; a valve chamber comprising an intake end and a discharge end distal to the intake end, wherein the valve chamber is in fluid communication with the intake conduit at the intake end and the inlet of the gas admission valve assembly at the discharge end; a valve seat fixedly provided at the discharge end of the valve chamber, wherein the valve seat includes a channel extending therethrough, a discharge conduit in fluid communication with the channel of the valve seat; a valve body movably provided within the valve chamber, wherein the valve body includes a control orifice extending therethrough and the control orifice is configured to regulate a position of the valve body between the intake end and the discharge end of the valve chamber based on a pressure difference between the intake conduit and the discharge conduit; and a spring member arranged between the valve seat and the valve body, wherein the spring member is configured to bias the valve body towards the intake end of the valve chamber, wherein the valve body is configured to abut against the valve seat to prevent a flow of the gaseous fuel between the valve chamber and the channel of the valve seat in response to a first predetermined pressure difference between the intake conduit and the discharge conduit.

A method may comprise actuating a valve of a gas admission valve assembly to cause a flow of fluid to pass from an inlet to an outlet of the gas admission valve assembly, wherein the gas admission valve assembly operating with one or more pressure differentials relating to the flow of the fluid; and limiting, via a flow limiter assembly, the flow of fluid provided to the inlet of the gas admission valve assembly in response to the one or more operational parameters exceeding a threshold.

DETAILED DESCRIPTION

In an aspect, a gas flow limiter assembly may be configured to regulate the flow of fluid, such as gaseous fuel, into a gas admission valve assembly. This may be accomplished by integrating the gas flow limiter assembly in the gas admission valve assembly housing or coupling a separate flow limiter assembly housing with the gas admission valve assembly housing. The gas flow limiter assembly may be used as a mechanical mitigation strategy for an over fueling event, which may be caused by the gas admission valve assembly.

Figure 1:
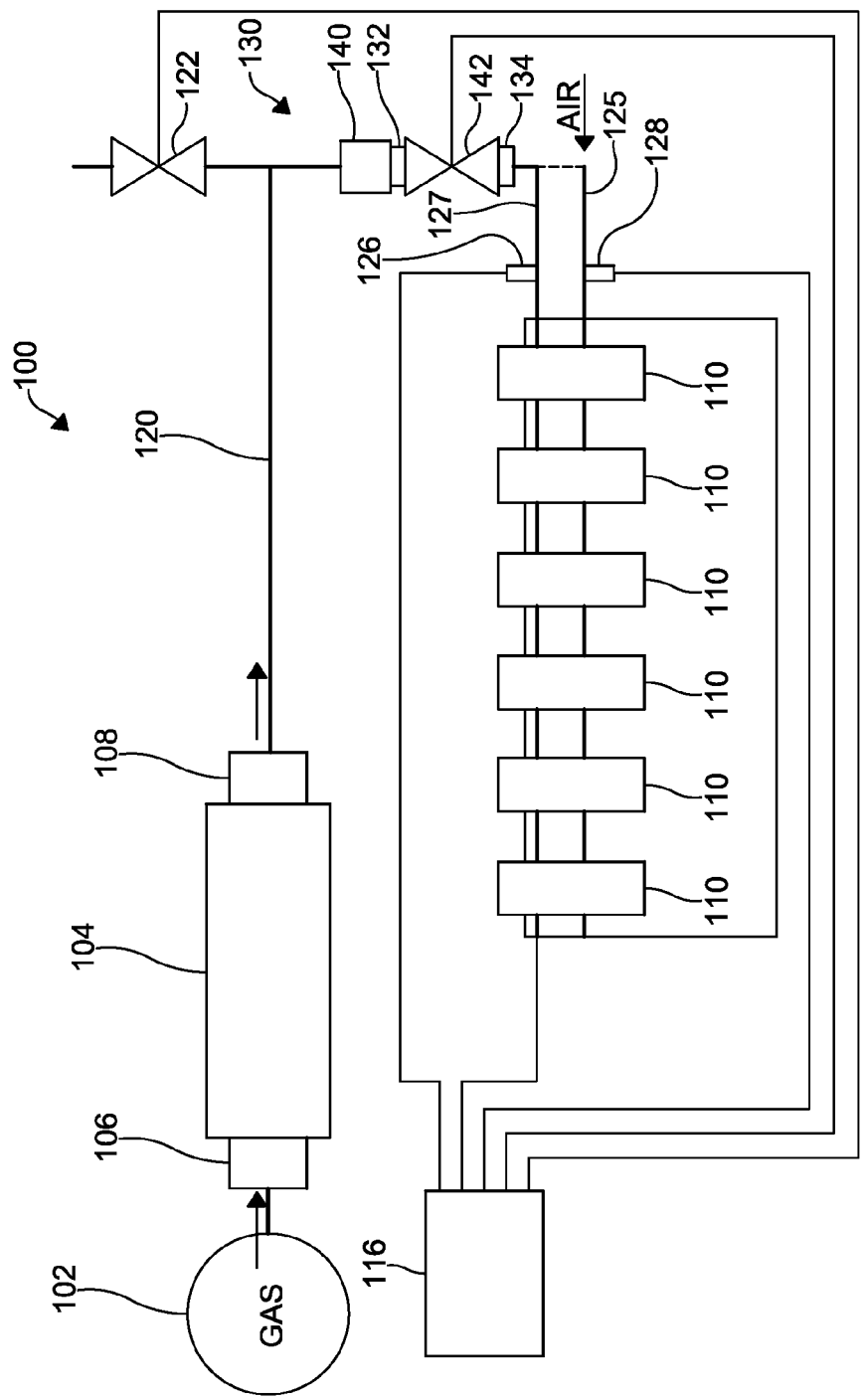
FIG. 1 is a schematic diagram of a gas fired engine including a gas admission system having a gas flow limiter assembly in accordance with aspects of the present disclosure.

Referring to FIG. 1, a gas-fired engine 100 and in particular a gas admission system 130 including a flow limiter assembly 140, are illustrated. The engine 100 shown in FIG. 1 may include a gas pressure regulating unit 104 including a gas pressure regulating unit inlet 106 and a gas pressure regulating unit outlet 108. The gas pressure regulating unit 104 may be configured to receive gas (e.g., natural gas) at a supply pressure at the gas pressure regulating unit 104 inlet supplied by a gas fuel source 102. The gas fuel pressure of the gas fuel supplied by the gas fuel source 102 may be higher than the gas fuel pressure appropriate for supplying the gas fuel into one or more combustion chambers 110 of the gas fired engine 100. Therefore, the gas pressure regulating unit 104 may be configured to reduce the gas fuel pressure to an injection pressure appropriate for supplying or injecting the gas fuel into the combustion chambers 110. Accordingly, the gas pressure regulating unit 104 may be configured to discharge the gas at an injection pressure, which may be lower than the supply pressure, at the gas pressure regulating unit outlet 108.

A gas supply conduit 120 may be arranged to fluidly connect the gas pressure regulating unit 104 outlet with a valve inlet 132 of the gas admission system 130. As gas fired engines 100 often include more than one combustion chamber 110, and it may be appropriate that each combustion chamber 110 is associated with its own gas admission system 130. In this case, the gas supply conduit 120 may be configured to connect the gas pressure regulating unit outlet 108 with each of the valve inlets 132 of the gas admission systems 130.

The gas admission system 130 may include a valve outlet 134. As an example, the valve outlet 134 may be in fluid communication with an air intake manifold 125 configured to provide air and/or an air/gas mix to the combustion chambers 110. As such, the gas admission system 130 may be configured to control admission of a gaseous fuel into the combustion chamber, for example, via the air intake manifold 125. The gas-to-air ratio entering the combustion chambers 110 may be controlled via the controlled admission of gas via the gas admission system 130. As another example, the valve outlet 134 may be in fluid communication with a gas intake manifold 127 configured to provide gas directly to the combustion chambers 110. As such, the gas admission system 130 may be configured to admit the gas having the injection pressure at a predetermined time for a predetermined duration into the engine gas inlet of, for example, each combustion chamber 110.

As will be described in further detail below, the gas admission system 130 may include the flow limiter assembly 140 and a gas admission valve assembly 142. The flow limiter assembly 140 may be in fluid communication with the gas admission valve assembly 142 and may be configured to regulate the ingress of fluid, such as gaseous fuel, to the gas admission valve assembly 142. The flow limiter assembly 140 may be configured to avoid shutdown of the engine 100 as a consequence of possible load rejection events. The flow limiter assembly 140 may also be configured to manage component failures such as the gas admission valve assembly 142 being stuck in an open position and admitting unwanted fuel.

In an aspect, the engine 100 may include an engine control module 116 configured to control the gas admission valve assembly 142 so that gas to be burnt in the at least one combustion chamber 110 of the gas fired engine 100 is admitted into the at least one combustion chamber 110. The engine 100 may include a first sensing device 126 configured to sense the injection gas pressure and a second sensing device 128 configured to sense the intake air pressure. Various arrangements of the sensing devices 126, 128 may be used including piezoresistive strain gauge, capacitive, electromagnetic, piezoelectric, optical, potentiometric, and the like sensors. An engine control module 116 may be configured to communicate with both the first sensing device 126 and the second sensing device 128. The engine control module 116 may be further configured to control a valve 122 so that the valve 122 relieves overpressure of the gas in the gas supply conduit 120, if the pressure differential between the injection gas pressure sensed by the first sensing device 126 and the intake air pressure sensed by the second sensing device 128 is above the predetermined threshold. In an aspect, the valve 122 may be configured as a pressure relief valve to automatically relieve overpressure of the gas in the gas supply conduit 120, if the pressure differential is above the predetermined threshold, by applying the intake air pressure and the injection gas pressure on appropriate inlets of the valve 122.

Figure 2:
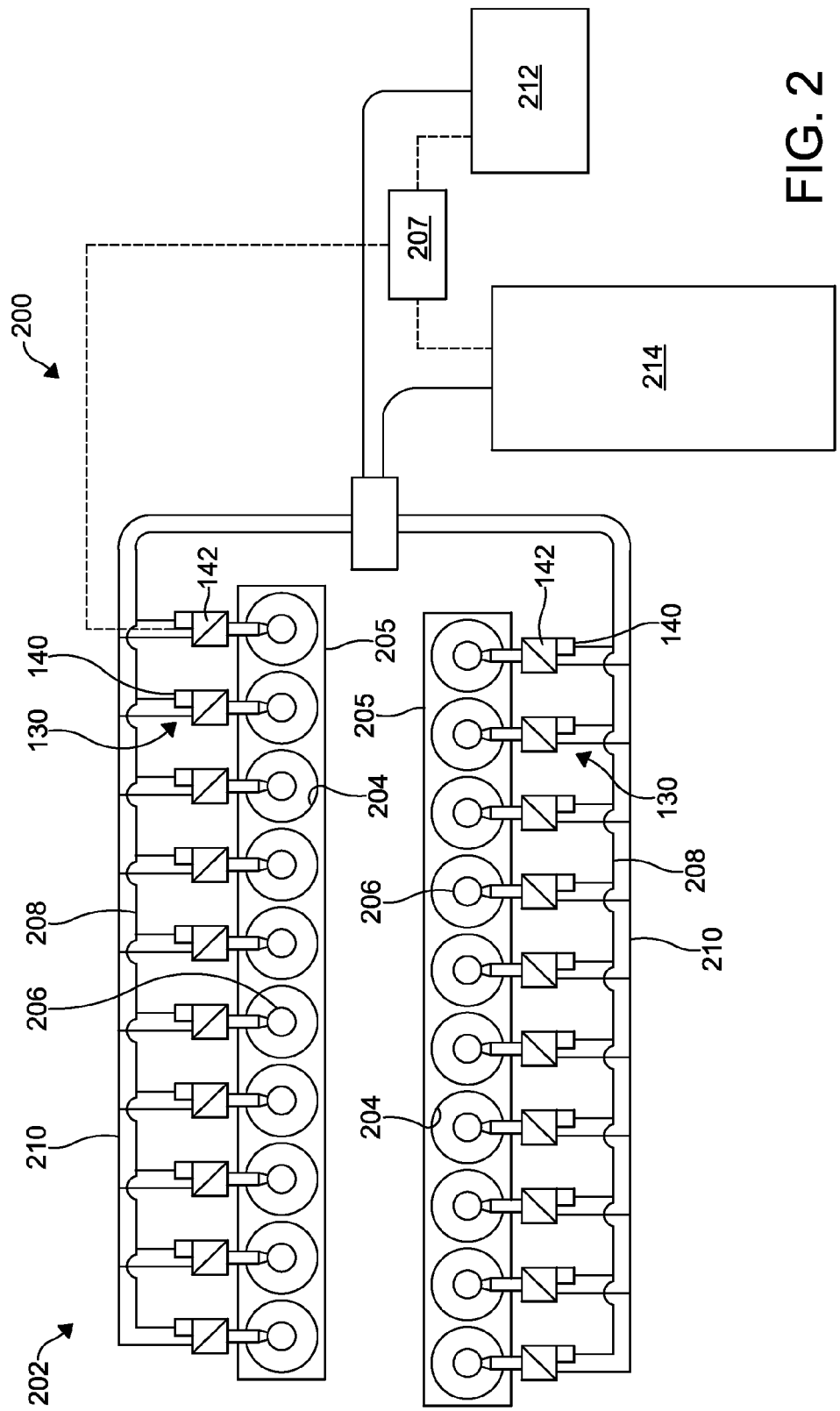
FIG. 2 is a schematic diagram of a duel fuel engine system including a gas admission system having a gas flow limiter assembly in accordance with aspects of the present disclosure.

FIG. 2 is a schematic view of an example duel fuel engine 200 according to an aspect of the present disclosure. The engine 200 may be used in a variety of applications, for example, but not limited to, mining, construction, agriculture, transportation, power generation, marine applications, and so on. The engine 200 may include a dual fuel rail system 202 that supplies fuel to a plurality of cylinders 204 provided in an engine housing 205. The dual fuel rail system 202 includes an injector 206 for each of the multiple cylinders 204. An electronic control module (ECM) 207 may regulate each of the injectors 206.

The dual fuel rail system 202 may include a liquid fuel common rail 208 and a gaseous fuel common rail 210 fluidly connected to each of the injectors 206. The liquid fuel common rail 208 is configured to supply each of the injectors 206 with a liquid fuel, for example, diesel. Further, the gaseous fuel common rail 210 is configured to supply each of the injectors 206 with a gaseous fuel, for example, compressed natural gas (CNG). Separate fuel injectors for each type of fuel are contemplated as well. The liquid fuel common rail 208 is in fluid communication with a liquid fuel supply system 212, while the gaseous fuel common rail 210 is in fluid communication with the flow limiter assembly 140 and a gaseous fuel supply system 214.

One or more gaseous fuel control devices such as the gas admission system 130 may be configured to regulate a flow of the gaseous fuel to the respective cylinder 204. As shown, each of a plurality of the gas admission systems 130 may be configured to regulate an amount of gaseous fuel that may be admitted (e.g., direct admission, via an intake valve, via injector 206, etc.) into the respective cylinder 204.

As will be described in further detail below, the gas admission system 130 may include the flow limiter assembly 140 and the gas admission valve assembly 142. The flow limiter assembly 140 may be in fluid communication with the gas admission valve assembly 142 and may be configured to regulate the ingress of fluid, such as gaseous fuel, to the gas admission valve assembly 142. The flow limiter assembly 140 may be configured to avoid shutdown (or other undesirable operation) of the engine 200 as a consequence of possible load rejection events. The flow limiter assembly 140 may also be configured to manage component failures such as the gas admission valve assembly 142 being stuck in an open position and admitting unwanted fuel.

Figure 3:
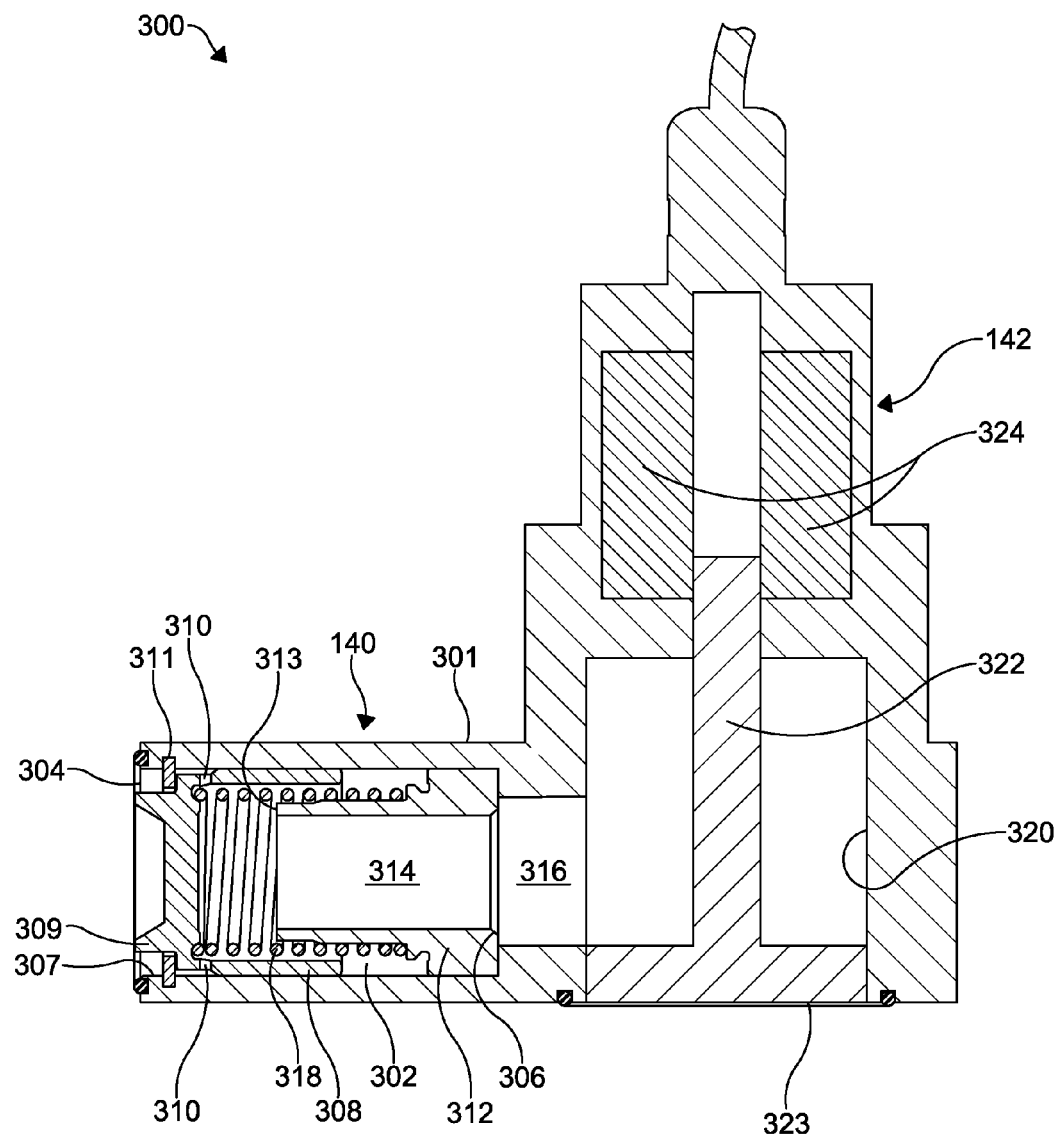
FIG. 3 is a cross-sectional view of a gas admission system including a gas admission valve assembly and a gas flow limiter assembly in accordance with aspects of the present disclosure and showing the gas flow limiter assembly in a closed position.

FIG. 3 illustrates a cross-sectional view of a gas admission system 300 according to aspects of the present disclosure. The gas admission system 300 may be implemented as the gas admission system 130 (FIGS. 1 and 2) and may include a housing 301 that includes the flow limiter assembly 140 and the gas admission valve assembly 142. As shown, the flow limiter assembly 140 may include a valve chamber 302 defined by a portion of the housing 301. The valve chamber 302 may have an intake end 304 opposite a discharge end 306. In an aspect, an inlet port 307 may be defined by a portion of the housing 301 and may be disposed at the intake end 304 of the valve chamber 302.

A valve body 308 may be moveably disposed in the valve chamber 302 and may slideably engage a portion of the housing 301. The valve body 308 may include a protrusion 309 formed therein, which may be oriented toward the intake end 304 of the valve chamber 302. The protrusion 309 may have various shapes such as a ring shape, for example.

The valve body 308 may include one or more control orifices 310 extending therethrough. The control orifices 310 may be of varying size and shape. Further, the control orifices 310 may include one or multiple flow restriction means configured to controllably manipulate flow dynamics of the system. The control orifices 310 may provide fluid communication between the intake end 304 and the discharge end 306 of the valve chamber 302. The control orifices 310 may be configured to regulate a position of the valve body 308 between the intake end 304 and the discharge end 306 of the valve chamber 302 based on a pressure difference between the intake end 304 and the discharge end 306 of the valve chamber 302. In certain aspects, the pressure between the intake end 304 and the discharge end 306 of the valve chamber 302 may be between about 15 psi and 100 psi. A retainer 311, such as a snap ring, may be coupled to a portion of the housing 301 and configured to retain the valve body 308 in the valve chamber 302.

A valve seat 312 may be is fixedly disposed adjacent the discharge end 306 of the valve chamber 302. The valve seat 312 may be fixed to a portion of the housing 301 by various methods known in the art, for example, interference fit, welding, and so on. The valve seat 312 may include a sealing shoulder 313 disposed opposite the discharge end 306 of the valve chamber 302 and configured to abut a portion of the valve body 308, when the valve body 308 is in a seated position, thereby restricting the flow of fluid through the valve chamber 302. The valve seat 312 may include a channel 314 extending therethrough. The channel 314 may fluidly connect the valve chamber 302 with a conduit 316. Further, the conduit 316 may be in fluid communication with the gas admission valve assembly 142.

A spring member 318 may be disposed in the valve chamber 302 and may be configured to bias the valve body 308 away from the valve seat 312. As an example, the spring member 318 may be or include a coil spring. Other biasing elements may be used. In an aspect, the spring member 318 may be configured to bias the valve body 308 to abut the retainer 311, when the valve body 308 is in a closed position, thereby restricting fluid flow (e.g., gaseous fuel) through the valve chamber 302.

The gaseous fuel that ends up flowing through the flow limiter assembly 140 may flow via the conduit 316 into a valve chamber 320 of the gas admission valve assembly 142. The gas admission valve assembly 142 may include a valve body 322 that can be actuated to control a flow of fluid though an outlet 323. In an aspect, one or more solenoids 324 may be configured to affect a magnetic field that may cause movement of the valve body 322. Other types of actuators are contemplated as well to cause the movement of the valve body 322.

Figure 4:
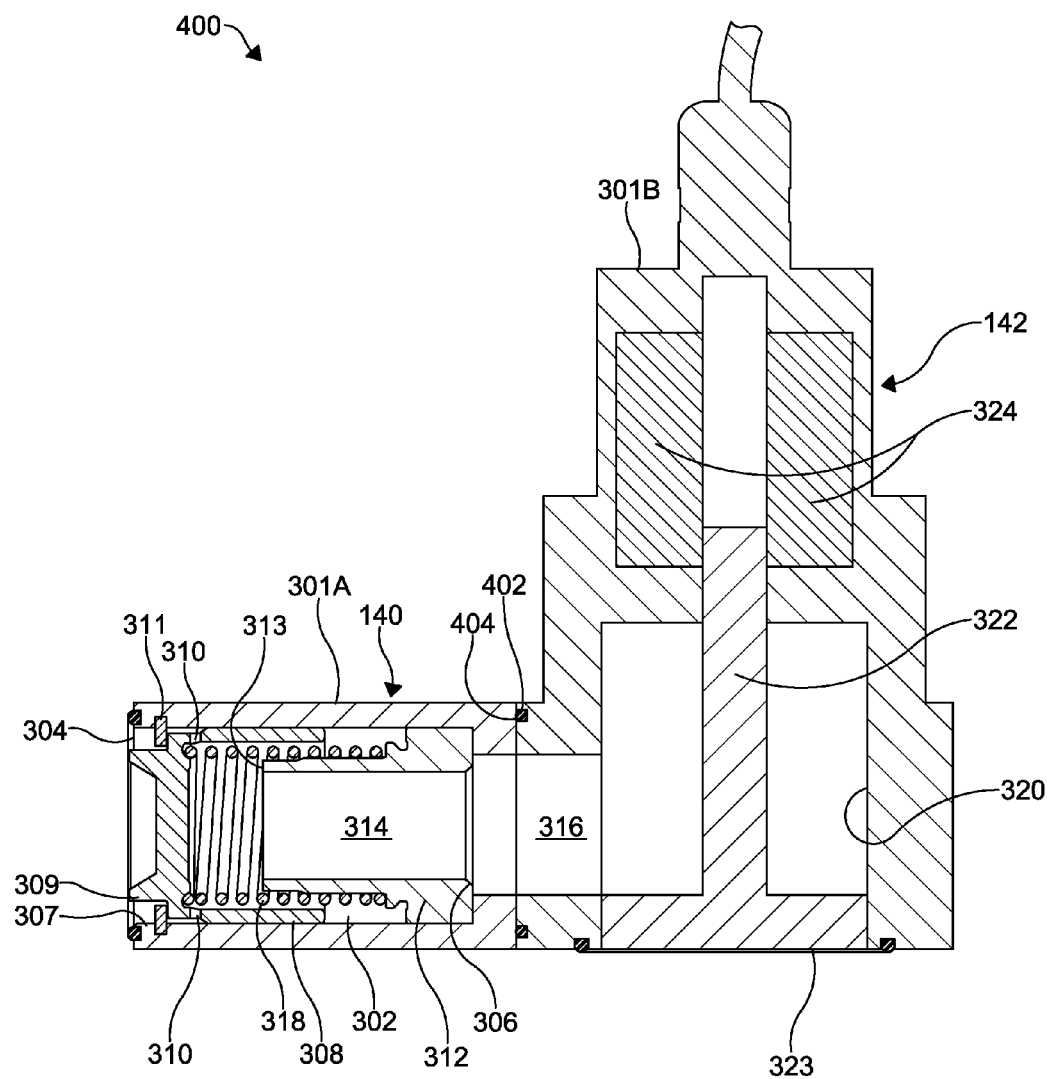
FIG. 4 is a cross-sectional view of a gas admission system including a gas admission valve assembly and a gas flow limiter assembly in accordance with aspects of the present disclosure and showing the gas flow limiter assembly in a closed position.

FIG. 4 illustrates a gas admission system 400 according to another aspect of the present disclosure. The gas admission system 400 may include similar components as the gas admission system 300 and further includes a separate flow limiter assembly housing 301A and gas admission valve housing 301B. The gas admission system 400 may be implemented as the gas admission system 130 (FIGS. 1 and 2). As an example, a channel 402 may be formed in one or more of the housings 301A, 301B, where the channel 402 is configured to receive a seal 404, such as an O-ring. The seal 404 may be used to provide sealing engagement therebetween. As a further example, the flow limiter assembly 140 may be mated to the gas admission valve assembly 142 by other sealing methods known in the art, for example, a metal-to-metal seal, a combination of an O-ring and a metal-to-metal seal, welding, brazing, etc.

INDUSTRIAL APPLICABILITY

The gas admission systems 130, 300, 400 of the present disclosure may be used with various engines, manifolds, and/or fluid systems such as a gaseous fuel system. The various operational modes of the flow limiter assembly 140, as described below, may cater to various operational requirements and/or malfunctions of the engines, manifolds, and/or fluid systems. As an example, the gas admission systems 130, 300, 400 of the present disclosure may be configured to mitigate failures in a gas or dual-fuel fired engine that include gas admission devices, e.g. SOGAVs (Solenoid-Operated Gas Admission Valves). In particular, the present disclosure may be directed to avoid shutdown (or other undesirable operation) of an engine as a consequence of possible load rejection events. The flow limiter assembly 140 may also be configured to manage component failures such as the gas admission valve assembly 142 being stuck in an open position and admitting unwanted fuel.

Various operational modes of the gas admission systems 130, 300, 400 will be described hereinafter with reference to FIGS. 5 and 6. Although references are made to the gas admission system 300 of FIG. 3, other gas admission systems and flow limiter assemblies, such as the flow limiter assembly 140 may be used and may operate in similar modes. Reference will also be made to FIGS. 1 and 2. The gas admission systems 130, 300, 400 and the related methods of operation may be controlled in response to one or more operational parameters. In an aspect, a flow of fluid to the gas admission valve assembly 142 may be limited (e.g., via the flow limiter assembly 140) based upon the one or more operational parameters exceeding a predefined threshold. Such operational parameters may include a flow rate, a flow duration, and/or a maximum fluid volume. The operational parameters may include a fluid pressure, which may be developed by the flow rate and the flow duration. As such, by monitoring and tuning a flow rate for a certain duration, any operation outside or in excess of a pre-determined normal operating range may act to trigger a seating of the flow limiter assembly 140.

Figure 5:
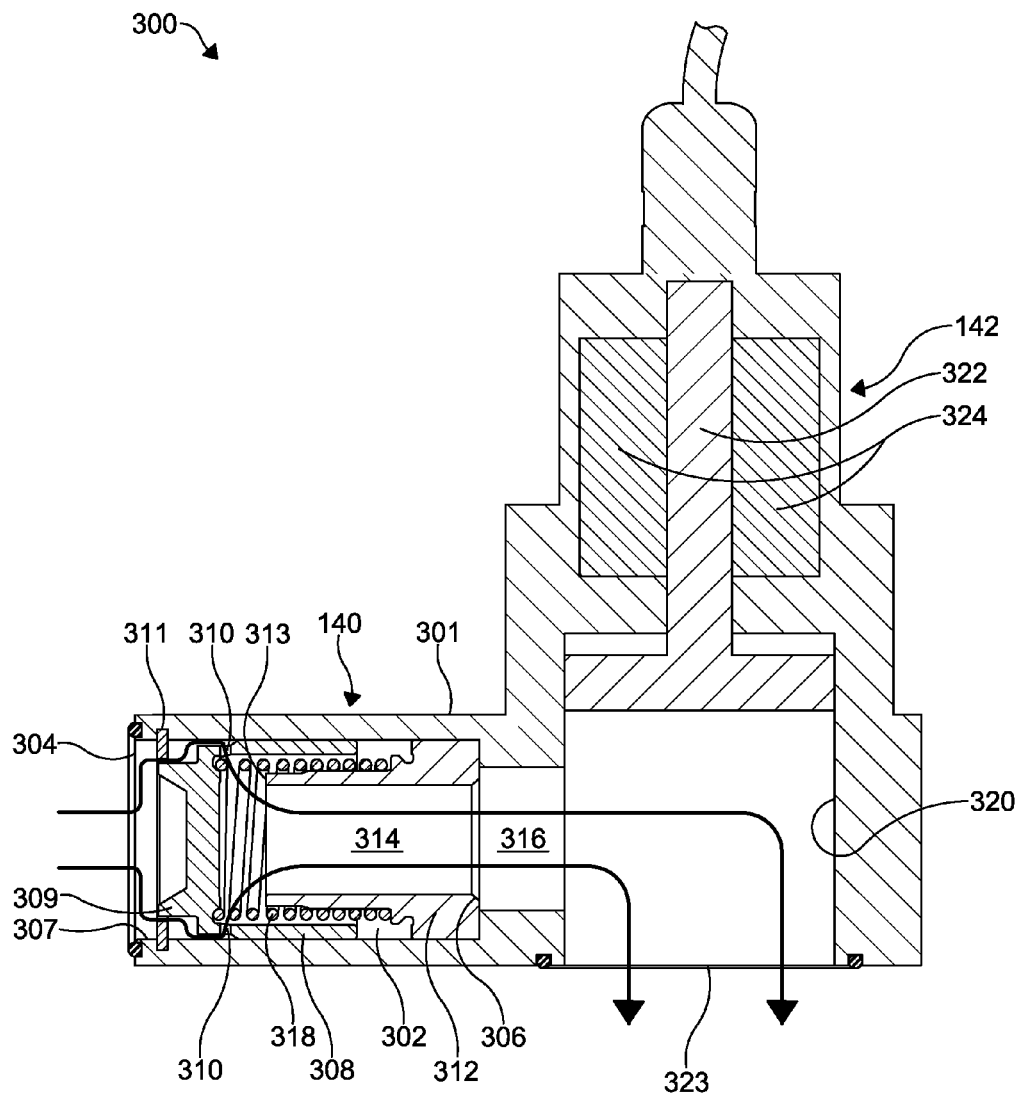
FIG. 5 is a cross-sectional view of the gas admission system of FIG. 3 showing the gas flow limiter assembly in an open position.

FIG. 5 illustrates an operational mode of the gas admission system 300. The valve body 308 is in an open position (e.g., intermediate position) between the intake end 304 and the discharge end 306 of the valve chamber 302. The spring member 318 is compressed when compared to the closed position of the valve body 308 shown in FIG. 3. As shown in FIG. 5, fluid (e.g., gaseous fuel) may flow through the flow limiter assembly 140 and may exit through the gas admission valve assembly 142. In an aspect, the control orifices 310 may allow a flow of the fluid from the intake end 304 of the valve chamber 302 to an internal volume defined by the valve body 308. The fluid may then flow to the discharge end 306 of the valve chamber 302 via the channel 314 defined by the valve seat 312. The fluid may flow from the channel 314 through the conduit 316 and into the valve chamber 320 of the gas admission valve assembly 142. With the valve body 322 actuated in the open position of the gas admission valve assembly 142, the fluid flowing into the valve chamber 320 may exit the gas admission system 130 via the outlet 323. In an aspect, a range of motion of the valve body 308 may be regulated by the stiffness and the preloading of the spring member 318 and flow dynamics provided via the control orifices 310. As such, the spring member 318 and the control orifices 310 may regulate the position of the valve body 308 between the intake end 304 and the discharge end. The dimensions of the control orifices 310, a cross-sectional area of the valve body 308, a surface area and/or shape of the protrusion 309, and the stiffness of the spring member 318 may be configured based upon the flow properties of the gas admission valve assembly 142. For example, the dimensions of the valve chamber 320 and valve body 322, the actuation time of the valve body 322, and/or the fluid volume and flow rate provided by the gas admission valve assembly 142 may be used to tune the configurations of the flow limiter assembly 140. In this way, the operational positions of the valve body 308 may be appropriate for various applications and may operate as a failsafe for malfunction of the gas admission valve assembly 142.

Figure 6:
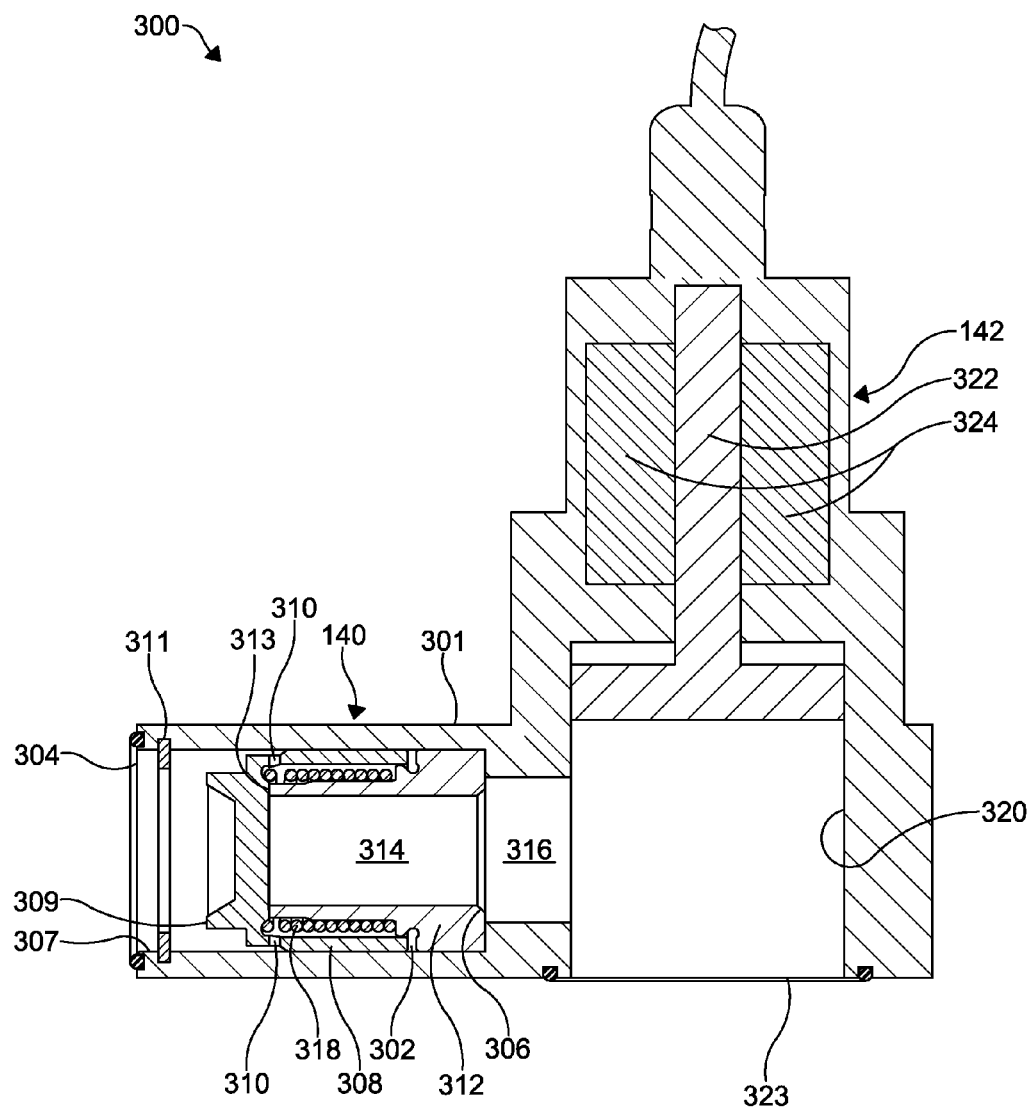
FIG. 6 is a cross-sectional view of the gas admission system of FIG. 3 showing the gas flow limiter assembly in a seated position.

FIG. 6 illustrates an operational mode of the gas admission system 300. The valve body 308 is shown in a seated position, where the valve body 308 abuts the sealing shoulder 313 of the valve seat 312. The spring member 318 is compressed when compared to the closed position of the valve body 308 shown in FIG. 3 and the open positions shown in FIG. 5. As shown in FIG. 6, a flow of fluid (e.g., gaseous fuel) may be restricted (e.g., limited or ceased) through the flow limiter assembly 140 and fluid may not exit through the flow limiter assembly 140 to the gas admission valve assembly 142. The dimensions of the control orifices 310, a cross-sectional area of the valve body 308, a surface area and/or shape of the protrusion 309, and the stiffness of the spring member 318 may be configured so as to control a movement and/or position of the valve body 308 under various pressure conditions. Under certain pressures, the valve body 308 may abut the valve seat 312 and prevent a flow of the liquid fuel between the valve chamber 302 and the channel 314 of the valve seat 312 in order to prevent over-fueling via the gas admission valve assembly 142. As an example, when the gas admission valve assembly 142 is operating outside of normal operating ranges (e.g., pressures, timing, flow properties, etc.) the valve body 308 of the flow limiter assembly 140 may be caused to move into the seated position (FIG. 6) to prevent additional fluid from passing through the gas admission valve assembly 142.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A gas admission system comprising:
   a gas admission valve assembly having an inlet, an outlet, and a valve configured to control a flow of fluid between the inlet and the outlet; and
   a flow limiter assembly in fluid communication with the inlet of the gas admission valve assembly, the flow limiter assembly comprising:
   an intake conduit configured to receive a gaseous fuel;
   a valve chamber comprising an intake end and a discharge end distal to the intake end, wherein the valve chamber is in fluid communication with the intake conduit at the intake end and the inlet of the gas admission valve assembly at the discharge end;
   a valve seat fixedly provided at the discharge end of the valve chamber, wherein the valve seat includes a channel extending therethrough;
   a discharge conduit in fluid communication with the channel of the valve seat;
   a valve body movably provided within the valve chamber, the valve body comprising a control orifice extending therethrough, wherein the control orifice is configured to regulate a position of the valve body between the intake end and the discharge end of the valve chamber based on a pressure difference between the intake conduit and the discharge conduit; and a spring element disposed between the valve seat and the valve body, wherein the spring element is configured to bias the valve body towards the intake end of the valve chamber, wherein the valve body is configured to abut against the valve seat to prevent a flow of the gaseous fuel between the valve chamber and the channel of the valve seat in response to a first predetermined pressure difference between the intake conduit and the discharge conduit.

2. The gas admission system of claim 1, wherein the valve of the gas admission valve assembly is a solenoid actuated valve.

3. The gas admission system of claim 1, wherein the flow limiter assembly is integrated with a housing of the gas admission valve assembly.

4. The gas admission system of claim 1, wherein the flow limiter assembly comprises a housing that is coupled to a housing of the gas admission valve assembly.

5. The gas admission system of claim 4, further comprising a seal disposed between the housing of the flow limiter assembly and the housing of the gas admission valve assembly to provide sealing engagement therebetween.

6. An internal combustion engine, comprising:
a gaseous fuel source;
a plurality of cylinders;
a gas admission valve assembly having an inlet in fluid communication with the gaseous fuel source and an outlet in fluid communication with at least one of the plurality of cylinders;
a flow limiter assembly comprising:
an intake conduit configured to receive a gaseous fuel from the gaseous fuel source;
a valve chamber comprising an intake end and a discharge end distal to the intake end, wherein the valve chamber is in fluid communication with the intake conduit at the intake end and the inlet of the gas admission valve assembly at the discharge end;
a valve seat fixedly provided at the discharge end of the valve chamber, wherein the valve seat includes a channel extending therethrough, a discharge conduit in fluid communication with the channel of the valve seat;
a valve body movably provided within the valve chamber, wherein the valve body includes a control orifice extending therethrough and the control orifice is configured to regulate a position of the valve body between the intake end and the discharge end of the valve chamber based on a pressure difference between the intake conduit and the discharge conduit; and
a spring member arranged between the valve seat and the valve body, wherein the spring member is configured to bias the valve body towards the intake end of the valve chamber,
wherein the valve body is configured to abut against the valve seat to prevent a flow of the gaseous fuel between the valve chamber and the channel of the valve seat in response to a first predetermined pressure difference between the intake conduit and the discharge conduit.

7. The internal combustion engine of claim 6, wherein the internal combustion engine is configured as a dual fuel internal combustion engine.

8. The internal combustion engine of claim 6, wherein the internal combustion engine is configured as a gaseous fuel internal combustion engine.

9. The internal combustion engine of claim 6, wherein the flow limiter assembly is disposed adjacent the inlet of the gas admission valve assembly.

10. The internal combustion engine of claim 6, further comprising a control unit is configured to receive a pressure differential and to actuate the gaseous fuel admission valve in response to the pressure differential.

11. The internal combustion engine of claim 6, wherein the valve of the gas admission valve assembly is a solenoid actuated valve.

12. The internal combustion engine of claim 6, wherein the flow limiter assembly is integrated with a housing of the gas admission valve assembly.

13. The internal combustion engine of claim 6, wherein the flow limiter assembly comprises a housing that is coupled to a housing of the gas admission valve assembly.

14. The internal combustion engine of claim 13, further comprising a seal disposed between the housing of the flow limiter assembly and the housing of the gas admission valve assembly to provide sealing engagement therebetween.

15. A method comprising:
actuating a valve of a gas admission valve assembly to cause a flow of fluid to pass from an inlet to an outlet of the gas admission valve assembly, wherein the gas admission valve assembly operating with one or more pressure differentials relating to the flow of the fluid; and
limiting, via a flow limiter assembly, the flow of fluid provided to the inlet of the gas admission valve assembly in response to the one or more operational parameters exceeding a threshold.

16. The method of claim 15, wherein the flow limiter assembly comprises:
an intake conduit configured to receive a gaseous fuel from a gaseous fuel source;
a valve chamber comprising an intake end and a discharge end distal to the intake end, wherein the valve chamber is in fluid communication with the intake conduit at the intake end and the inlet of the gas admission valve assembly at the discharge end;
a valve seat fixedly provided at the discharge end of the valve chamber, wherein the valve seat includes a channel extending therethrough, a discharge conduit in fluid communication with the channel of the valve seat;
a valve body movably provided within the valve chamber; and
a spring member provided between the valve seat and the valve body, wherein the spring member is configured to bias the valve body towards the intake end of the valve chamber.

17. The method of claim 16, wherein the valve body comprises a control orifice extending therethrough, wherein the control orifice is configured to regulate a position of the valve body between the intake end and the discharge end of the valve chamber based on a pressure difference between the intake conduit and the discharge conduit.

18. The method of claim 15, wherein the one or more operational parameters comprises a flow rate or a flow duration.

19. The method of claim 15, wherein the gas admission valve assembly is configured to admit gaseous fuel to a cylinder of a dual fuel internal combustion engine.

20. The method of claim 15, wherein the gas admission valve assembly is configured to admit gaseous fuel to an air intake manifold of an internal combustion engine.

* * * * *